US011184288B2

(12) United States Patent
Snowdon

(10) Patent No.: US 11,184,288 B2
(45) Date of Patent: Nov. 23, 2021

(54) SYSTEM AND A METHOD FOR CONTROLLING TIMING OF PROCESSING NETWORK DATA

(71) Applicant: Arista Networks, Inc., Santa Clara, CA (US)

(72) Inventor: David Snowdon, Darlinghurst (AU)

(73) Assignee: Arista Networks, Inc., Santa Clara, CA (US)

(*) Notice: Subject to any disclaimer, the term of this patent is extended or adjusted under 35 U.S.C. 154(b) by 146 days.

(21) Appl. No.: 16/246,455

(22) Filed: Jan. 11, 2019

(65) Prior Publication Data

US 2020/0228455 A1   Jul. 16, 2020

(51) Int. Cl.
*H04L 1/18* (2006.01)
*H04L 12/841* (2013.01)
*H04L 12/26* (2006.01)
*H04L 12/823* (2013.01)
*H04L 12/851* (2013.01)

(52) U.S. Cl.
CPC .............. *H04L 47/283* (2013.01); *H04L 1/18* (2013.01); *H04L 43/106* (2013.01); *H04L 47/2483* (2013.01); *H04L 47/32* (2013.01)

(58) Field of Classification Search
CPC ... H04L 1/1854; H04L 1/1887; H04L 5/0055; H04L 1/08; H04L 47/283; H04L 1/189; H04L 29/08; H04L 12/841; H04L 1/18; H04L 47/2483; H04L 47/32; H04L 43/106; H04L 51/20; H04L 51/12; H04L 12/26; H04L 12/823; H04L 12/851; H04J 3/0682
See application file for complete search history.

(56) References Cited

U.S. PATENT DOCUMENTS

| | | | | |
|---|---|---|---|---|
| 7,069,490 B2* | 6/2006 | Niu | ....................... | H04L 1/0071 370/216 |
| 7,095,715 B2* | 8/2006 | Buckman | ................ | H04L 12/14 370/230 |
| 7,468,661 B2* | 12/2008 | Petite | ..................... | G08C 17/02 340/540 |
| 7,515,612 B1* | 4/2009 | Thompson | .............. | H04L 69/16 370/474 |
| 8,321,865 B2* | 11/2012 | Amini | ..................... | G06F 9/542 718/101 |
| 8,489,747 B2* | 7/2013 | Aisen | .................... | H04L 47/283 709/226 |
| 10,623,143 B2* | 4/2020 | Ho | ........................ | H04L 1/0071 |
| 10,742,593 B1* | 8/2020 | Vasquez | .............. | H04L 67/1097 |
| 10,873,533 B1* | 12/2020 | Ismailsheriff | ....... | H04L 47/2441 |

(Continued)

OTHER PUBLICATIONS

International Search Report issued in corresponding Application No. PCT/IB2020/000039, dated Jul. 7, 2020.

(Continued)

*Primary Examiner* — Sargon N Nano
(74) *Attorney, Agent, or Firm* — Chamberlain, Hrdlicka, White, Williams & Aughtry

(57) ABSTRACT

Embodiments of the invention relate to methods and systems for processing network traffic data units. The methods and systems may include functionality for generating a first network traffic data unit comprising an indication that the first network traffic unit should be delayed for a time before re-transmission to a client device; and transmitting the first network traffic data unit to a first edge device.

14 Claims, 7 Drawing Sheets

(56) References Cited

U.S. PATENT DOCUMENTS

| | | | | |
|---|---|---|---|---|
| 10,917,352 B1* | 2/2021 | Hanes | | H04L 47/323 |
| 2002/0159396 A1* | 10/2002 | Carlson | | H04L 47/32 |
| | | | | 370/252 |
| 2003/0193947 A1* | 10/2003 | Kikinis | | H04L 12/2856 |
| | | | | 370/389 |
| 2004/0215753 A1* | 10/2004 | Chan | | H04L 47/10 |
| | | | | 709/223 |
| 2004/0218561 A1* | 11/2004 | Obuchi | | H04L 1/1867 |
| | | | | 370/328 |
| 2005/0122987 A1* | 6/2005 | Ignatowski | | H04L 41/145 |
| | | | | 370/412 |
| 2005/0141455 A1* | 6/2005 | Kim | | H04L 69/165 |
| | | | | 370/331 |
| 2006/0035589 A1* | 2/2006 | Shvodian | | H04L 1/1858 |
| | | | | 455/18 |
| 2007/0180169 A1* | 8/2007 | Mizuno | | H04L 1/1887 |
| | | | | 710/74 |
| 2008/0273547 A1* | 11/2008 | Phinney | | H04W 40/16 |
| | | | | 370/437 |
| 2009/0300673 A1* | 12/2009 | Bachet | | H04L 67/104 |
| | | | | 725/31 |
| 2010/0218231 A1* | 8/2010 | Frink | | H04N 21/23439 |
| | | | | 725/118 |
| 2013/0230326 A1* | 9/2013 | Hu | | H04J 3/1652 |
| | | | | 398/67 |
| 2013/0297774 A1 | 11/2013 | Pope et al. | | |
| 2014/0277655 A1* | 9/2014 | Millington | | H04L 65/4084 |
| | | | | 700/94 |
| 2014/0328325 A1* | 11/2014 | Bai | | H04W 36/0077 |
| | | | | 370/331 |
| 2016/0294890 A1 | 10/2016 | Miller | | |
| 2016/0321228 A1 | 11/2016 | Thiesen et al. | | |
| 2017/0331587 A1* | 11/2017 | Kim | | H04L 1/00 |
| 2017/0331775 A1* | 11/2017 | Parizhsky | | H04L 51/20 |
| 2017/0373804 A1* | 12/2017 | Han | | H04W 4/70 |
| 2018/0012868 A1* | 1/2018 | Huang | | H01L 25/0657 |
| 2018/0092115 A1* | 3/2018 | Krasnyanskiy | | H04W 72/1231 |
| 2020/0099636 A1* | 3/2020 | Arquero | | H04L 51/04 |

OTHER PUBLICATIONS

Written Opinion issued in corresponding Application No. PCT/IB2020/000039, dated Jul. 7, 2020.

* cited by examiner

SYSTEM AND A METHOD FOR CONTROLLING TIMING OF PROCESSING NETWORK DATA

BACKGROUND

Scenarios exist in which accurately timed release of certain information may be desired. For example, unemployment statistics may need to be released at a certain time. As another example, scenarios may exist in which two or more entities should receive information at substantially the same time so that no one entity gains an advantage by receiving the information before one or more other entities. Conversely, scenarios exist in which two or more entities seek to transmit information to a common recipient, and the order that the recipient receives the two items of information is different from the order they were transmitted.

SUMMARY

In general, in one aspect, embodiments of the invention relate to a method for processing network traffic data units. In one or more embodiments of the invention, the method includes generating a first network traffic data unit comprising an indication that the first network traffic unit should be delayed for a time before re-transmission to a client device; and transmitting the first network traffic data unit to a first edge device.

In general, in one aspect, embodiments of the invention relate to a system for processing network traffic data units. In one or more embodiments of the invention, the system includes a data processing device operatively connected, via a network, to a first edge device and a second edge device. In one or more embodiments of the invention, the data processing device is configured to receive a network traffic data unit; process the network traffic data unit to determine an action to perform; perform the action; generate, after performing the action, a first reply network traffic data unit comprising an indication that the first reply network traffic unit should be delayed for a time before re-transmission to a client device; and transmit the first reply network traffic data unit to the first edge device.

In general, in one aspect, embodiments of the invention relate to a method for processing network traffic data units. In one or more embodiments of the invention, the method includes receiving, at a first edge device, a first network traffic data unit at a first time; appending a first ingress timestamp to the first network traffic data unit based on the first time; receiving, at a second edge device, a second network traffic data unit at a second time; appending a second ingress timestamp to the second network traffic data unit based on the second time; transmitting the first network traffic data unit, via a network, from the first edge device to a data processing device; and transmitting the second network traffic data unit, via the network, from the second edge device to the data processing device.

In general, in one aspect, embodiments of the invention relate to a system for processing network traffic data units. In one or more embodiments of the invention, the system includes a data processing device. In one or more embodiments of the invention, the system also includes a first edge device operatively connected to the data processing device and configured to receive a first network traffic data unit at a first time; append a first ingress timestamp to the first network traffic data unit based on the first time; and transmit the first network traffic data unit, via a network, to the data processing device. In one or more embodiments of the invention, the system also includes a second edge device operatively connected to the data processing device and configured to receive a second network traffic data unit at a second time; append a second ingress timestamp to the second network traffic data unit based on the second time; and transmit the second network traffic data unit, via the network, from the second edge device to the data processing device.

Other aspects of the invention will be apparent from the following description and the appended claims.

DETAILED DESCRIPTION

Figure 1:
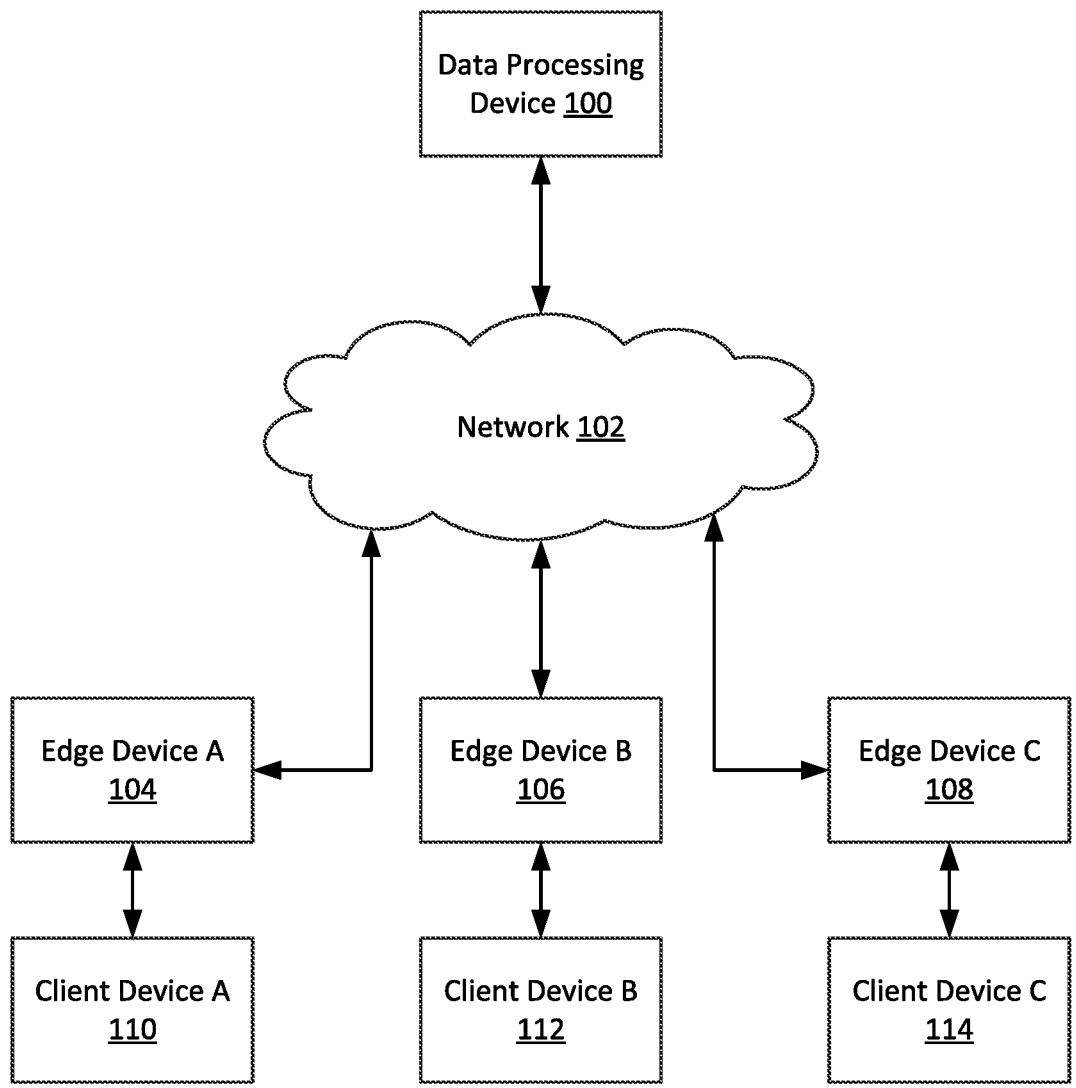
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to systems and methods for receiving and processing network traffic data units. Specifically, in one or more embodiments of the invention, one or more network traffic data units are received at a data processing device. In one or more embodiments of the invention, the data processing device performs one or more actions in response. After performing the action, two or more entities may be notified that the one or more actions were performed, and such entities may need to be notified at substantially the same time. However, due to network latency between the data processing device and network devices at the edge of a network to which the intended recipients are connected, the timing of the distribution of network traffic data units to said recipients may not occur at substantially the same time.

In one or more embodiments of the invention, the aforementioned lack of timing synchronization may be mitigated, at least in part, by the data processing device recognizing the timing sensitivity of the action performed and, in response to such recognition, adding timestamps to one or more network traffic data units related to the action and intended for the two or more recipients, with the added timestamps indicating a future time at which the one or more network traffic data units related to the action should be transmitted to the two or more recipients. In one or more embodiments of the invention, the timestamp, which may be referred to herein as a presentation timestamp, indicates a future time that takes into account a certain percentage (e.g., 99%) of the worst case scenario network latency between the data processing device and the edge network devices to which the one or more network traffic data units related to the action are to be sent.

In one or more embodiments of the invention, a data processing device may be configured to receive one or more network traffic data units related to request that the data processing device perform one or more actions. In one or more embodiments of the invention, such actions are time sensitive, and should be performed at the order in which they were received by edge network devices of a network to which the data processing device is operatively connected. In such scenarios, instead of processing the received network traffic data units in the order received by the data processing device, the data processing device includes functionality to queue received network traffic data units and process such network traffic data units based on a timestamp added by edge network devices indicating the time the network traffic data units were received at the network rather than the time the network traffic data units were received by the data processing device.

Such systems and methods may create scenarios where data distributed to and/or received from data recipients occurs in a manner that is more fair, as no data recipient may gain an advantage over others by causing situations where a given data recipient is able to receive or transmit data more quickly than other data recipients.

For example, financial instruments (e.g., stocks, bonds, etc.) are often traded using technology housed at the physical location of exchanges on which the financial instruments are traded. One or more computing devices may make up at least a portion of the exchange, and may interface, via a network (e.g., a topology of routers, multi-layer switches, top-of-rack switches, bridges, etc. that provide connectivity between computing devices), with one or more computing devices (e.g., servers in a server rack) controlled by persons or entities that desire to receive information from the exchange and/or conduct trades via interacting with the exchange (i.e., trading entities).

A trading entity may gain an advantage over other trading entities if the computing devices under their control receive market data (e.g., price data, trade data, trade trend data, etc.) from the exchange and/or send orders (e.g., market orders or limit orders to buy or sell) to the exchange faster than the other trading entities, meaning the data received from or transmitted to an exchange may be considered time sensitive. In such a scenario, as to market data, a computing device of a trading entity may be a data recipient, and a computing device of an exchange may be a data processing device.

When such a scenario exists due to the actions of the trading entity gaining the advantage, the scenario may be considered unfair to the trading entities that end up at a disadvantage in speed of data receipt from or transmission of data to the exchange. Examples of such actions include, but are not limited to: using knowledge of network protocols (e.g., a multicast protocol) and the topology of computing devices and network devices of the network to cause certain network devices to perform worse than others (e.g., by causing queues to be consistently more full on certain network devices); modeling the latency characteristics of the network to gain knowledge not available to other traders; etc. Other examples of scenarios where fair delivery of time sensitive information is desired include, but are not limited to, computer gaming competitions, electronic gambling competitions, and real estate auctions.

In one or more embodiments of the invention, unfairness such as that discussed above may be mitigated, at least in part, using systems and methods that add future timestamps (i.e., presentation timestamps) to outgoing network traffic data units that help synchronize transmission to data recipients, and/or add ingress timestamps to network traffic data units received at the edge of a network, thereby allowing a data processing device within the network to process network traffic data in an order based on the ingress timestamp rather than on the order in which such data units are received by the data processing device.

FIG. 1 shows a system in accordance with one or more embodiments of the invention. As shown in FIG. 1, the system includes one or more data processing devices (e.g., data processing device (100)), a network (102), one or more edge devices (e.g., edge device A (104), edge device B (106), edge device C (108)), and one or more client devices (e.g., client device A (110), client device B (112), client device C (114)). Each of these components is described below.

In one or more embodiments of the invention, a data processing device (100), devices within the network (102), edge devices (104, 106, 108) and client devices (110, 112, 114) are computing devices. In one or more embodiments of the invention, a computing device is any device or any set of devices capable of electronically processing instructions and that includes, at least, one or more processors, memory, input and output device(s), and operative network connectivity to one or more network devices. Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one or more embodiments of the invention, a data processing device (100) includes functionality to obtain data (e.g., market data) desired by one or more client devices (110, 112, 114), and/or to generate data desired by one or more client devices (110, 112, 114). In one or more embodiments of the invention, such data is processed to obtain one or more network traffic data units. In one or more embodiments of the invention, a network traffic data unit is any relevant data that is transmitted in a format dictated by any one or more network protocols or standards. Examples of such protocols or standards include, but are not limited to, Internet Protocol (IP), Media Access Control (MAC), Transmission Control Protocol (TCP), User Datagram Protocol (UDP), Infiniband, Hypertext Transfer Protocol (HTTP), etc. In one or more embodiments of the invention, the relevant data is at least a portion of the payload of a data unit of any format.

In one or more embodiments of the invention, a data processing device (100) includes functionality to transmit data units towards client devices (110, 112, 114). Such transmission of data units may be achieved, at least in part, via a network (102). In one or more embodiments of the invention, a network may be an entire network or any portion thereof. A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments of the invention, a network (102), and any network devices therein, may be arranged in any network topology. In one or more embodiments of the invention, a network topology is an arrangement of various devices of a network that facilitates the transmission of any number of network traffic data units from a data processing device (100) to one or more edge devices (104, 106, 108) to which client devices (110, 112, 114) are operatively connected. In one or more embodiments of the invention, the data processing device (100) is operatively connected to one or more edge devices (104, 106, 108) which, in turn, provide operative connectivity to one or more client devices (110, 112, 114) to which the data processing device (100) seeks to transmit to and/or receive from one or more network traffic data units.

In one or more embodiments of the invention, a network device (e.g., devices in the network (102), all or a portion of a data processing device (100), and/or edge devices (104, 106, 108)) may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and/or two or more physical network interfaces (which may also be referred to as ports). A network device may be connected to other devices via wired (e.g., using the ports) and/or wireless connections.

In one or more embodiments of the invention, a network device includes functionality to receive network traffic data units at any of the physical network interfaces (i.e., ports) of the network device, and to subsequently transmit network traffic data units from any of the physical network interfaces of the network device.

One example of a network device is a lower layer device. In one or more embodiments of the invention, a lower layer device is a device that includes one or more physical layer switches configured to provide physical connections between ports of the lower layer switch. A physical layer switch may be implemented, at least in part, as a crossbar switch, which has multiple input and output lines arranged in a crossed pattern, with each intersection serving as a switch that may be open to prevent a connection between two ports, or closed to form a connection between two ports of the lower layer device.

Physical layer switches may include functionality to receive network traffic data units from a given port of a lower layer device and, based on the configured connections of the physical layer switch, transmit the received network traffic data unit, or any other network traffic data unit, to one or more other ports to be transmitted toward whatever is connected to the output port.

As used herein, the term lower layer device may refer to devices that also include additional hardware (e.g., FPGA(s)) and/or software to allow for reconfiguration of the connections and other functionality. Such lower layer devices may, for example, function as reconfigurable patch panels. The reconfiguration may occur, for example, via a network administrator using management software to interact, over a network, with any of the hardware and/or software of the lower layer device to reconfigure the connections. Other functionality that may exist in a lower layer device, which may be enabled by additional hardware and/or software, includes, but is not limited to, media conversion, failover, data replication, aggregation, broadcast, monitoring, traffic sampling, multiplexing, filtering, etc.

Other examples of a network device include a higher level network device. Examples of a higher level network device include, but are not limited to, a layer 2 network switch, a router, a multilayer switch, a fibre channel device, an InfiniBand® device, etc. Higher level devices may include functionality to inspect all or certain portions of a network traffic data unit in order to determine whether to: (i) drop the network traffic data unit; (ii) process the network traffic data unit; and/or (iii) transmit the network traffic data unit, based on the processing, from a physical network interface or port on the higher level network device.

In one or more embodiments of the invention, a network device includes functionality to store (e.g., in persistent storage, in memory, in a register, etc.), any number of data structures (e.g., filtering information, delay time information, routing information base (RIB), queued and time-stamped network traffic data units, etc., forwarding information base (FIB), link state database, counters, etc.) for facilitating operation of at least some aspects of the network device.

Such structures may be stored in a data repository (not shown) included in and/or operatively connected to a network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.

In one or more embodiments of the invention, a data processing device (100) is any hardware (e.g., circuitry), software, firmware, or any combination thereof that includes functionality to receive network traffic data units and to perform one or more actions based on the receipt of such network traffic data units. For example the data processing device may be a network device that includes and/or is operatively connected to a matching engine of a stock exchange, and may be configured to pass network traffic data units to the matching engines and, upon receiving two or more responses generated by the matching engine after the matching engine performs an action, appending a presentation timestamp to the network traffic data units conveying the response. In one or more embodiments of the invention, the presentation timestamps may be used by edge devices (104, 106, 108) to determine when to send the network traffic data units to one or more client devices (110, 112, 114). In one or more embodiments of the invention, the data processing device (100) includes a matching engine and a network device. In other embodiments of the invention, the data processing device is separate from, but operatively connected to a matching engine (not shown).

As used herein, the phrase 'operatively connected' refers to any direct (e.g., wired directly between two devices) or indirect (e.g., wired and/or wireless connections between any number of devices connecting the operatively connected devices) connection.

In one or more embodiments of the invention, any above-described system component may also include software and/or firmware stored in any data repository (not shown) and/or memory (not shown) (i.e., non-transitory computer readable mediums). Such software and/or firmware may include instructions which, when executed by one or more processors (not shown) included in and/or operatively connected to the component, cause the one or more processors to perform operations in accordance with one or more embodiments of the invention.

The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention.

While FIG. 1 shows a configuration of components, other configurations may be used without departing from the scope of the invention. For example, there may be any number of data processing devices, network devices, edge devices, client devices, etc., which may be arranged in any manner. Accordingly, embodiments disclosed herein should not be limited to the configuration of components shown in FIG. 1.

Figure 2:
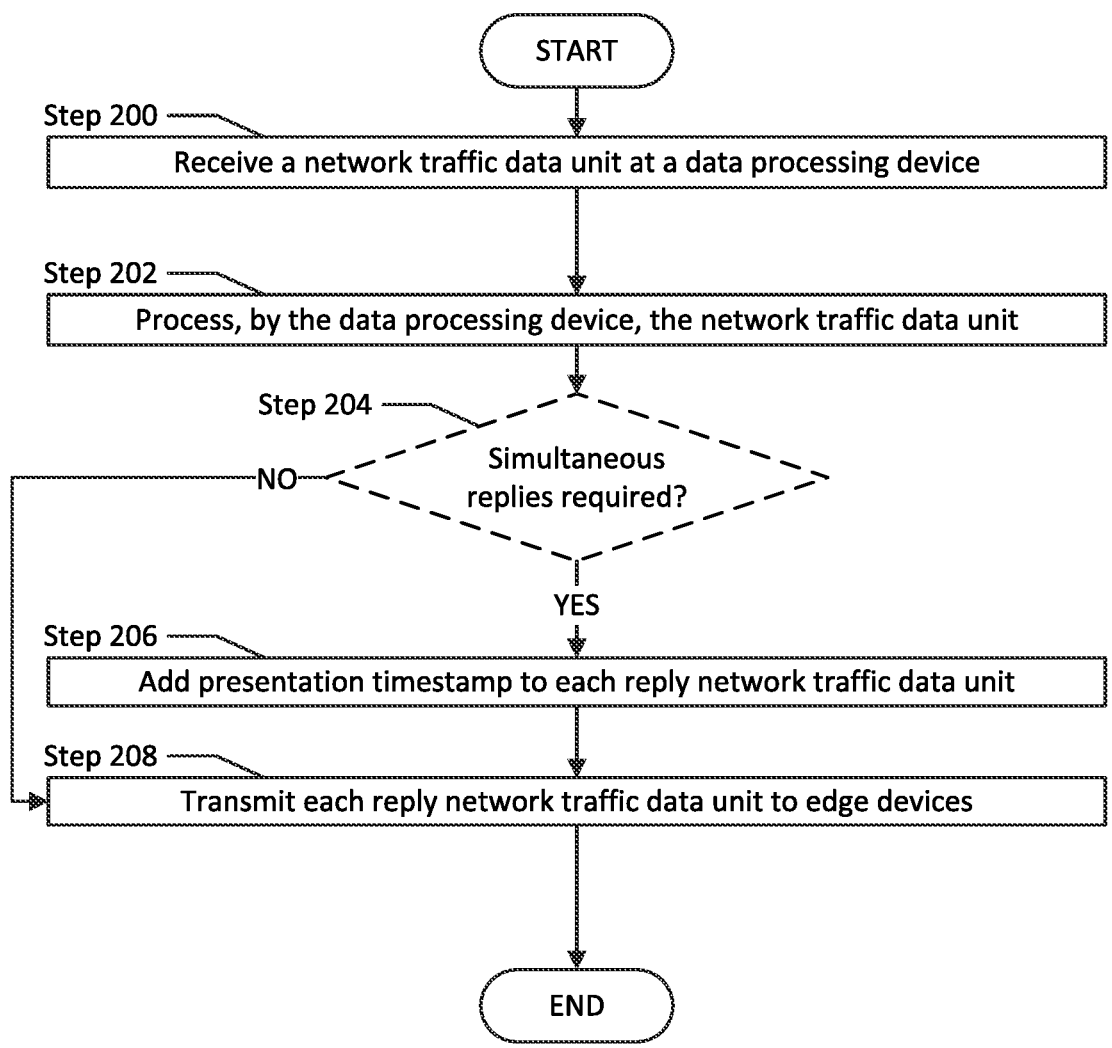
FIG. 2 shows a flowchart in accordance with one or more embodiments of the invention.

FIG. 2 shows a flowchart describing a method for processing and distributing network traffic data units in accordance with one or more embodiments of the invention. One or more steps shown in FIG. 2 may be omitted or repeated, and any steps may be performed in any different order among different embodiments of the invention.

In Step 200, network traffic data units are received at a data processing device. In one or more embodiments of the invention, the network traffic data units are received from entities seeking to have the data processing device perform one or more actions. For example, a trading entity may transmit one or more network traffic data units to a data processing device seeking to place an order for a purchase of a stock.

In Step 202, the data processing device may process the one or more network traffic data units to determine that an action is being requested by the sender of the one or more network traffic data units. For example, the action requested may be to purchase one or more stock shares at a given price (i.e., an order). In one or more embodiments of the invention, the data processing device processes the one or more network traffic data units to determine the action to perform, and whether said action requires two or more replies. In one or more embodiments of the invention, the data processing device processes the one or more network traffic data units to determine if a time delay should be used when sending a reply sent in response to receipt of the network traffic data unit. In one or more embodiments of the invention, a time delay is an amount of time that is farther in the future than absolutely required. In one or more embodiments of the invention, the time delay may be a constant time augmented by a random amount of time.

Although not shown in FIG. 2, in one or more embodiments of the invention, it is not required that a network traffic data unit is received and processed, or that any action is ever requested or performed. Instead, the method may begin with information being provided to the data processing device via an input/output device (e.g., a keyboard), or begin after a certain amount of time has passed from a past time.

Also, although not shown in FIG. 2, the network traffic data unit may be only partially processed, then have a presentation timestamp is added, then further processing occurs.

Step 204 is optional. Specifically, in one or more embodiments of the invention, Step 204 is only executed if the processing performed in Step 202 determines, at least, that the action to be performed in response to a receipt of a network traffic data unit requires two or more replies. In one or more embodiments of the invention, If Step 204 is not executed, then the process may delay the sending of a reply using any mechanism of delaying the sending of a network traffic data unit. An example of such a method is set forth below in Steps 206 and 208, and includes adding a presentation timestamp to the reply network traffic data units.

In Step 204, a determination is made as to whether substantially simultaneous replies are required. For example, if the one or more received network traffic data units indicated a request for the purchase of one or more shares of a given stock, and the data processing device performs functionality to facilitate such a purchase, the buyer, seller, and public may require a substantially simultaneous reply alerting the various entities that the purchase occurred. If a substantially simultaneous reply is not required, the process proceeds to Step 208. If on the other hand, a substantially simultaneous reply is required, the method proceeds to Step 206.

In Step 206, based on the determination in Step 204 that two or more replies are required to be transmitted to client devices at substantially the same time, a presentation timestamp is added to each reply network traffic data unit. Although Step 206 uses a presentation timestamp as the mechanism to indicate a future time, one having ordinary skill in the art and the benefit of this detailed description will appreciate that embodiments of the invention may include any scheme for modifying a network traffic data unit to provide an indication that the sending of the network traffic data unit should be delayed.

In one or more embodiments of the invention, a reply network traffic data unit is a network traffic data unit that is sent in response to the occurrence of any event. Examples of such events include prior receipt of a network traffic data unit, the performance of some action, the receipt of input of any sort, or the passing of any amount of time. For example, based at least in part on a known network latency of a network between the data processing device and the edge devices operatively connected to the client devices that are to receive the reply network traffic data units, the presentation timestamp may indicate a future time. Such a future time may be more time in the future than an amount of time injected into a network traffic data unit's data path through a network by a worst-case network latency value, thereby ensuring that all client devices receive said reply network traffic data units at substantially the same time.

In one or more embodiments of the invention, although not shown in FIG. 2, the presentation timestamp may include a random delay factor that adds an additional amount of time in the future to the presentation timestamp. In one or more embodiments of the invention, a presentation timestamp is created using a deterministic delay from the recorded receive time of a whatever event prompted the generation of a network traffic data unit, which may lead to a constant response time from the data processing device. In one or more embodiments of the invention, a random delay factor is randomly perturbed off the same source time stamp.

Although Step 206 describes two reply network traffic data units, one having ordinary skill in the art, and the benefit of this Detailed Description, will appreciate that any number of network traffic data units may be generated for any reason. For example, one network traffic data unit may be received, and the data processing device may respond by sending many network traffic data units. As another example, many network traffic data units may be received, and the data processing device may respond by sending a single network traffic data unit.

In Step 208, the network traffic data units with the presentation timestamps are transmitted to edge devices via a network. The reply network traffic data units may be transmitted over any communication channel between a data processing device and an edge device. For example, the data units may be transmitted via as MAC frames encapsulating IP packets that encapsulate information that one or more client devices are to receive, which are received via a wired connection between a data processing device and a port of an edge device (e.g., a lower layer device).

Figure 3:
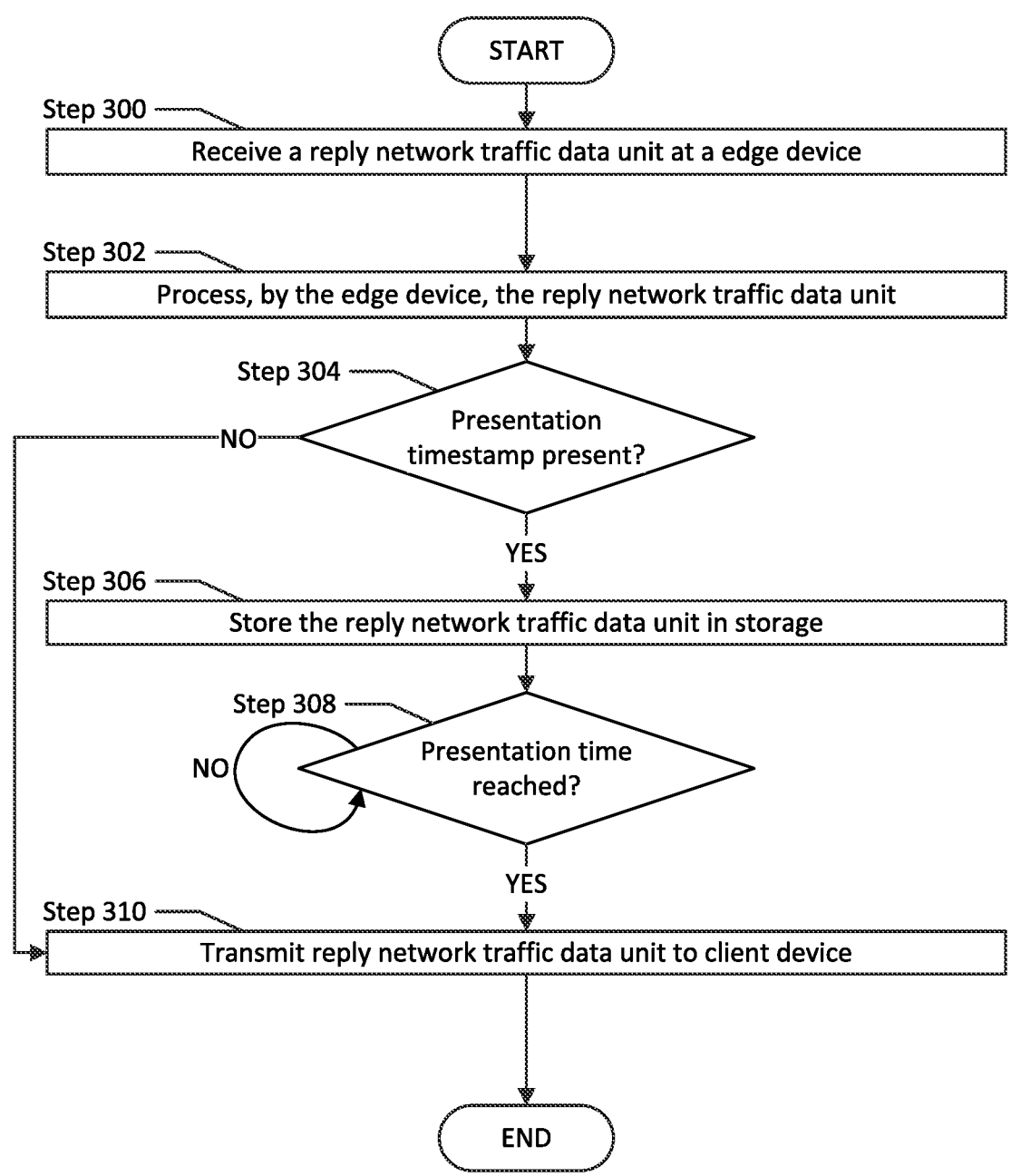
FIG. 3 shows a flowchart in accordance with one or more embodiments of the invention.

FIG. 3 shows a flowchart describing a method for processing and distributing network traffic data units in accordance with one or more embodiments of the invention. One or more steps shown in FIG. 3 may be omitted or repeated, and any steps may be performed in any different order among different embodiments of the invention.

In Step 300, one or more reply network traffic data units are received at an edge device. In one or more embodiments of the invention, the one or more reply network traffic data units are received, via a network, from a data processing device. In one or more embodiments of the invention, the one or more reply network traffic data units are received via a port of the edge device.

In Step 302, the edge device processes the one or more reply network traffic data units. In one or more embodiments of the invention, processing the reply network traffic data units includes examining the contents and/or headers and/or trailers of the reply network traffic data units to determine where to send the reply network traffic data units and/or when to send the reply network traffic data units.

In Step 304, a determination is made whether the reply network traffic data unit includes a presentation timestamp. In one or more embodiments of the invention, a presentation timestamp indicates a future time at which the edge device is to transmit one or more reply network traffic data units. In one or more embodiments of the invention, if an examined network traffic data unit does not include a presentation timestamp, the process proceeds to Step 310, and the network traffic data unit is transmitted. If, on the other hand, one or more reply network traffic data units include a presentation timestamp, the method proceeds to Step 306.

In Step 306, the one or more network traffic data units including a presentation timestamp are stored by the edge device in a storage device. In one or more embodiments of the invention, the storage device may be any type of storage available to the edge device. For example, the storage device may be a queue implemented in flash storage included as part of the edge network device.

In Step 308, a determination is made as to whether the presentation time (i.e., the future time) indicated by the presentation timestamp has been reached. For example, the edge device may include a clock that indicates time. In such an example, the value indicated by the time of the clock may be compared with the time included in the presentation timestamp until a match occurs. In one or more embodiments of the invention, if a match has not yet occurred, the process may continue to monitor the time of a clock. In one or more embodiments of the invention, if a match between the time of a clock and the time indicated by a presentation timestamp occurs, the method proceeds to Step 310.

In Step 310, after the presentation time indicated by the presentation timestamp is reached, the reply network traffic data unit is transmitted to a client device. In one or more embodiments of the invention, the transmission may be in accordance with a next-hop determination made prior to the presentation time using destination information in the header of the network traffic data unit.

In one or more embodiments of the invention, although not shown in FIG. 3, in some instances, the presentation time may be adjusted slightly earlier to calibrate for deterministic delays (e.g. cable delays) after transmission, etc.

Figure 4:
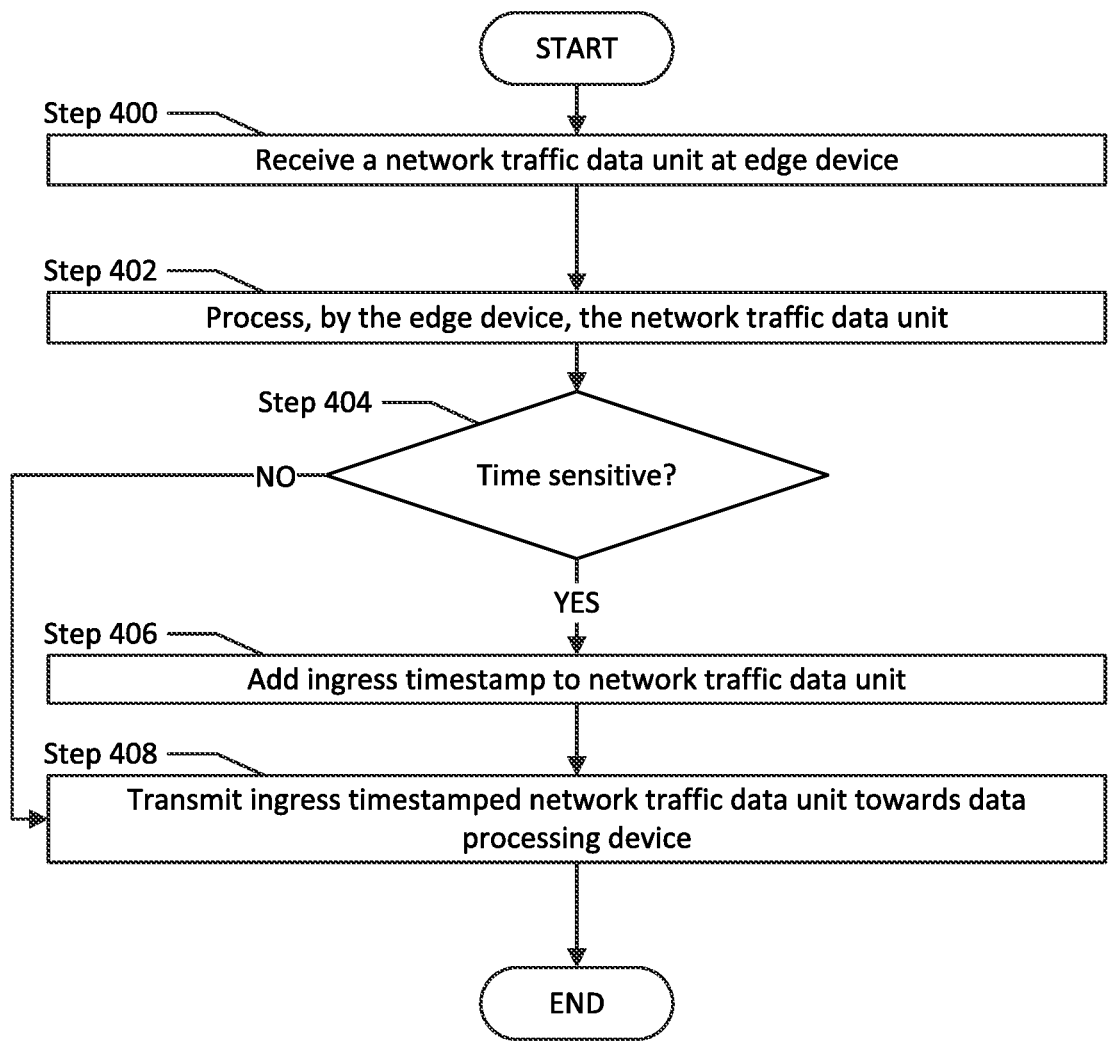
FIG. 4 shows a flowchart in accordance with one or more embodiments of the invention.

FIG. 4 shows a flowchart describing a method for processing and distributing network traffic data units in accordance with one or more embodiments of the invention. One or more steps shown in FIG. 4 may be omitted or repeated, and any steps may be performed in any different order among different embodiments of the invention.

In Step 400, one or more network traffic data units are received at an edge device from a client device. In one or more embodiments of the invention, the one or more network traffic data units are intended for a data processing device and seek to have the data processing device perform an action. For example, the one or more network traffic data units may be received at a port of the edge device and are intended to cause a data processing device to perform an order of one or more shares of a stock.

In Step 402, the edge device may process the one or more network traffic data units to determine that the one or more network traffic data units are intended for a data processing device. For example, the edge device may determine that the one or more network traffic data units include a destination IP address associated with the data processing device.

In Step 404, a determination is made as to whether the one or more received network traffic data units are time sensitive network traffic data units. For example, the received one or more network traffic data units may be an order to purchase one or more shares of a given stock, which may be considered time sensitive, as other orders for the stock may affect pricing of the stock. If the one or more network traffic data units are not time sensitive (e.g., they are merely administrative network traffic data units implementing a routing protocol), the method proceeds to Step 408. If, on the other hand, the one or more network traffic data units are time sensitive, the method proceeds to Step 406.

In one or more embodiments of the invention, although not shown in FIG. 4, all received network traffic data units are timestamped.

In Step 406, an ingress timestamp is added to the one or more network traffic data units. In one or more embodiments of the invention, an ingress timestamp is any information in any format that is affixed in any manner to a network traffic data unit that indicates a time at which the network traffic data unit was received. In one or more embodiments of the invention, an ingress timestamp indicates a time at which a network traffic data unit is received by an edge device. For example, an edge device may be configured to ascertain, from a clock, a time at which network traffic data units are received and, if the network traffic data unit has been determined to be time sensitive, to add an ingress timestamp that includes the ascertained time value.

In Step 408, the ingress timestamped network traffic data unit is transmitted towards a data processing device. For example, the ingress timestamped network traffic data unit may be encapsulated in an updated MAC frame for transmission to a next-hop device on a route through a network to the data processing device.

Figure 5:
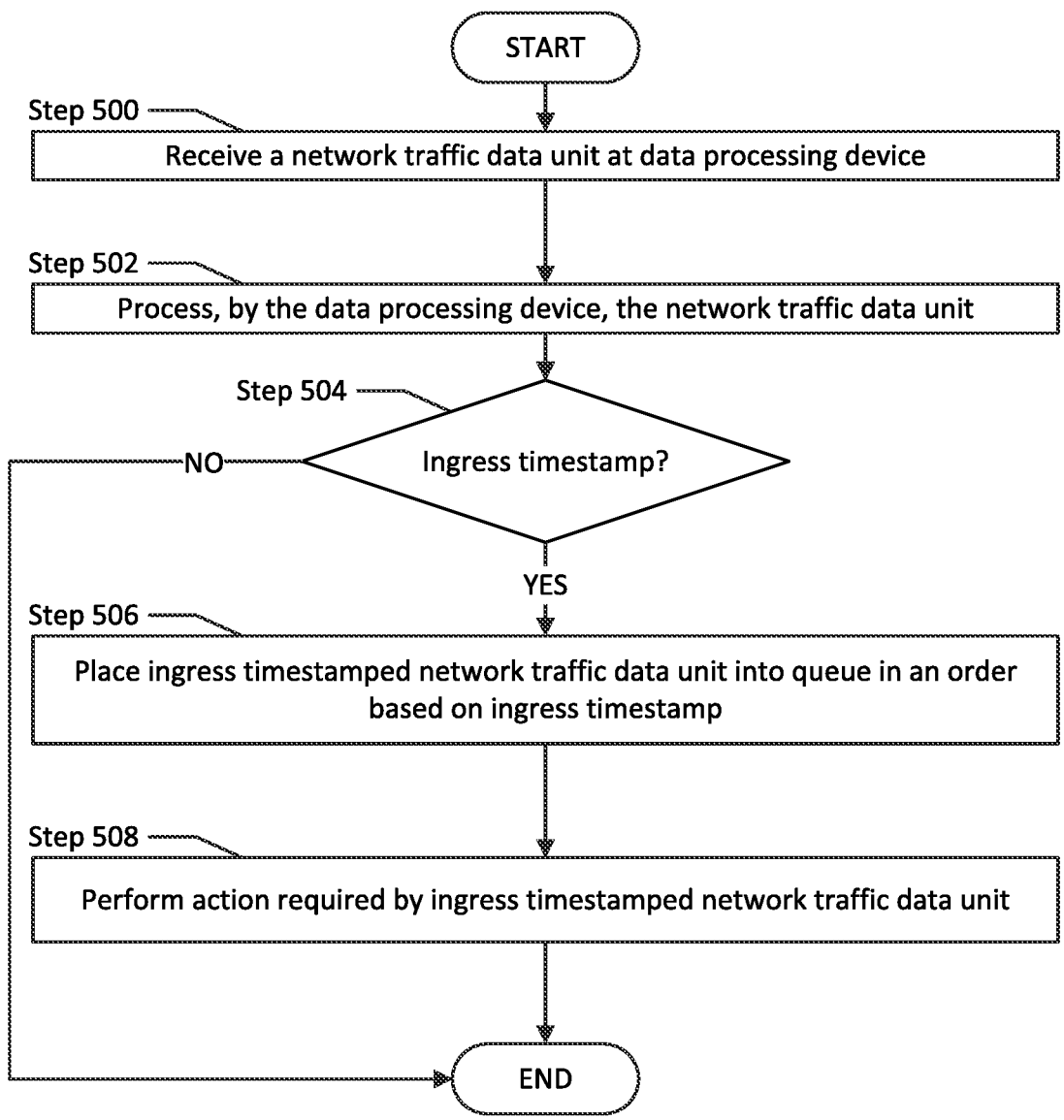
FIG. 5 shows a flowchart in accordance with one or more embodiments of the invention.

FIG. 5 shows a flowchart describing a method for processing and distributing network traffic data units in accordance with one or more embodiments of the invention. One or more steps shown in FIG. 5 may be omitted or repeated, and any steps may be performed in any different order among different embodiments of the invention.

In Step 500, one or more network traffic data units are received at a data processing device from an edge device via a network. In one or more embodiments of the invention, the one or more network traffic data units received at the data processing device are intended to cause a data processing device to perform an order of one or more shares of a stock.

In Step 502, the data processing device may process the one or more network traffic data units to determine whether the one or more network traffic data units indicate that the data processing device should perform an action. For example, the one or more network traffic data units may include instructions to purchase one or more shares of a certain stock at a given price.

In one or more embodiments of the invention, although not shown in FIG. 5, the data processing device may perform any manner of transform on the ingress timestamp as a method of determining processing order and/or generating a presentation timestamp. In one or more embodiments of the invention, the ingress timestamp may be used to generate a presentation timestamp according to a policy (e.g., constant delay, normal distribution response times, etc.)

In Step 504, a determination is made as to whether the one or more received network traffic data units include an ingress timestamp. For example, the network traffic data units may include a trailer that may be examined to determine whether an ingress timestamp is present. If the one or more network traffic data units do not include an ingress timestamp, the process ends and the network traffic data unit is processed by the data processing device. If, on the other hand, the one or more network traffic data units include an ingress timestamp, the method proceeds to Step 506.

In Step 506, the ingress timestamped network traffic data unit is placed into a queue in an order based at least in part on the ingress timestamp. In one or more embodiments of the invention, the data processing device is receiving ingress timestamped network traffic data units from a variety of edge devices. Due to network latency between the data processing device and such edge devices, a first network traffic data unit that was received by a first edge device at an earlier time than a second network traffic data unit was received by a second edge device may actually arrive at the data processing device after the second network traffic data unit. In such a scenario, in one or more embodiments of the invention, the first network traffic data unit has an ingress timestamp that indicates an earlier time of receipt than an ingress timestamp of the second network traffic data unit. Accordingly, in one or more embodiments of the invention, even though the data processing device receives the second network traffic data unit before the first network traffic data unit, the data processing device places the first network traffic data unit before the second network traffic data unit in a queue to be processed.

Although Step 506 is described as part of certain embodiments of the invention, one having ordinary skill in the art will appreciate that Step 506 may not necessarily be required for the invention.

In Step 508, the data processing device performs one or more actions indicated by the ingress timestamped network traffic data unit. For example, the ingress timestamped network traffic data unit may include an instruction to sell a certain number of stocks at a given price, which causes the data processing device to determine whether there is a buyer at that price and, if so, to execute the transaction.

Figure 6:
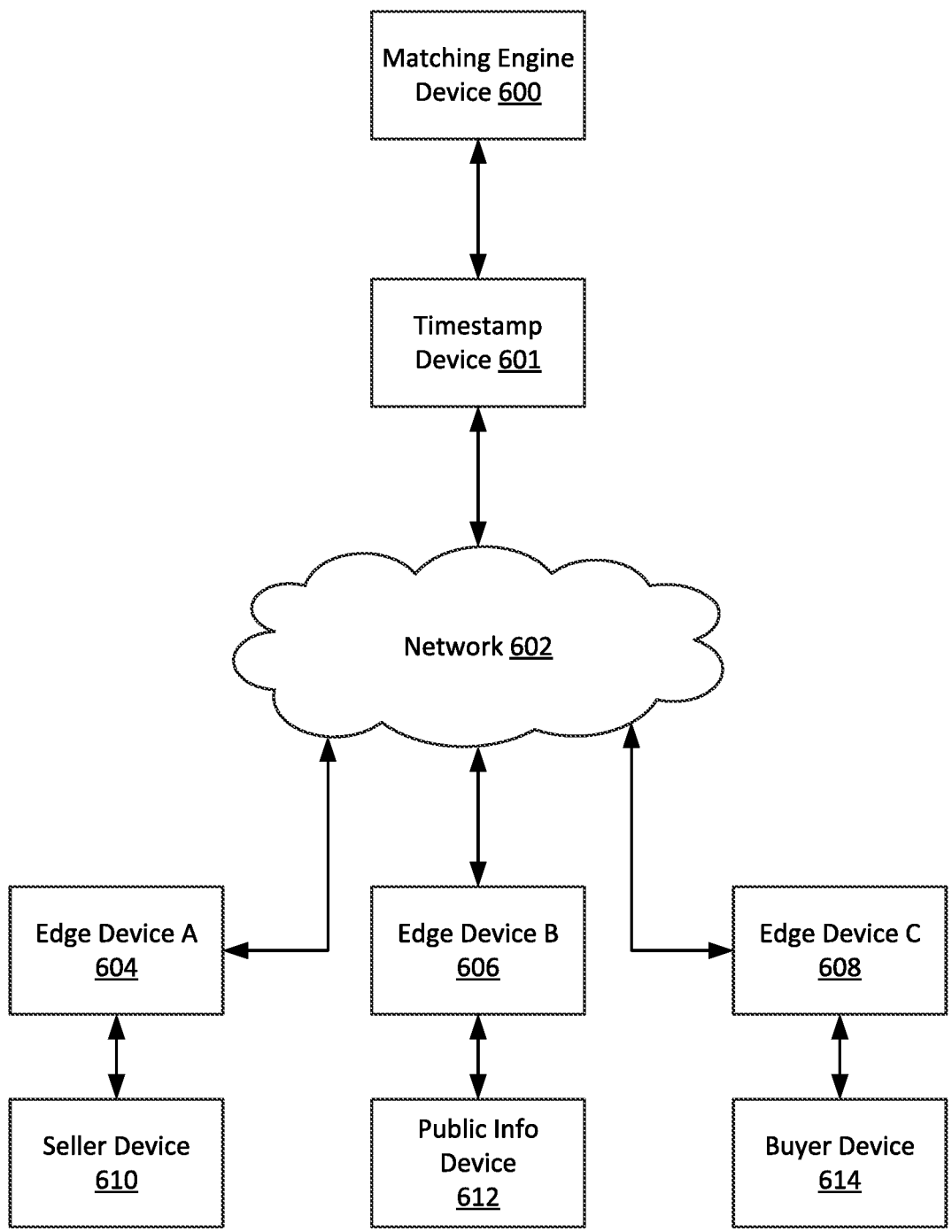
FIG. 6 shows an example in accordance with one or more embodiments of the invention.

FIG. 6 shows an example in accordance with one or more embodiments of the invention. The following example is for explanatory purposes only and not intended to limit the scope of the invention.

Referring to FIG. 6, consider a scenario in which a financial exchange has a matching engine (600) operatively connected to a timestamp device (601) (collectively, a data processing device). The timestamp device is operatively connected, via a network (602) to edge device A (604), edge device B (606), and edge device C (608). Edge device A (604) is operatively connected to a seller device (610). Edge device B (606) is operatively connected to a public info device (612). Edge device C (608) is operatively connected to a buyer device (614)

In such a scenario, the seller device (610), the public info device (612), and the buyer device (614) each wishes to receive data from the financial exchange. In order to help ensure fairness, the market data must be delivered to the recipients at substantially the same time, so that none (610, 612, 614) receives an unfair advantage derived from receipt of the market data, or any portion thereof, earlier than other recipients.

In this scenario, the seller device (610) sends network traffic data units to edge device A (604) that are intended for the matching engine of the financial exchange and indicate a desire to sell a certain number of shares at a given price. Edge device A (604) transmits the network traffic data units towards the matching engine (600) via the network (602). Similarly, the buyer device (614) sends network traffic data units to edge device C (608) that are intended for the matching engine of the financial exchange and indicate a desire to buy a certain number of shares at a given price.

Edge device C (608) transmits the network traffic data units towards the matching engine (600) via the network (602).

The matching engine (600), in response to receipt of the order to sell and the order to buy, matches the two in order to complete a transaction. At this point, the seller device (610), the buyer device (614), and the public info device (612), in the interest of fairness, should receive notice that the transaction occurred at substantially the same time. Therefore, the matching engine provides confirmation of the transaction to the timestamp device (601). The timestamp device is configured to know that the worst case latency of the network (602) is three seconds to any edge device. Therefore, the timestamp device (601) adds a presentation timestamp to three copies of the confirmation that indicates a time four seconds in the future. One copy of the confirmation is then transmitted to each of the edge devices (604, 606, 608).

Although not shown in the example scenario in FIG. 6, and as explicitly described above in the description of FIG. 1, a matching engine and a time stamp device may be portions of the same device. For example, the timestamp device may be a portion of a computing device on which the matching engine executes.

Upon receipt, the edge devices inspect the confirmation data and determine that they include a presentation timestamp. In response to the determination, the edge devices place the confirmation copies into storage, and then monitor a clock until the time matches the time indicated in the presentation timestamp. When the match occurs, at substantially the same time, edge device A (604) transmits the confirmation to the seller device (610), edge device B (606) transmits the confirmation to the public info device (612), and edge device C (608) transmits the confirmation to the buyer device (614). The sending at substantially the same time is subject to the clocks in the edge devices being synchronized via some means (e.g., PTP, PPS, NTP, etc.)

Figure 7:
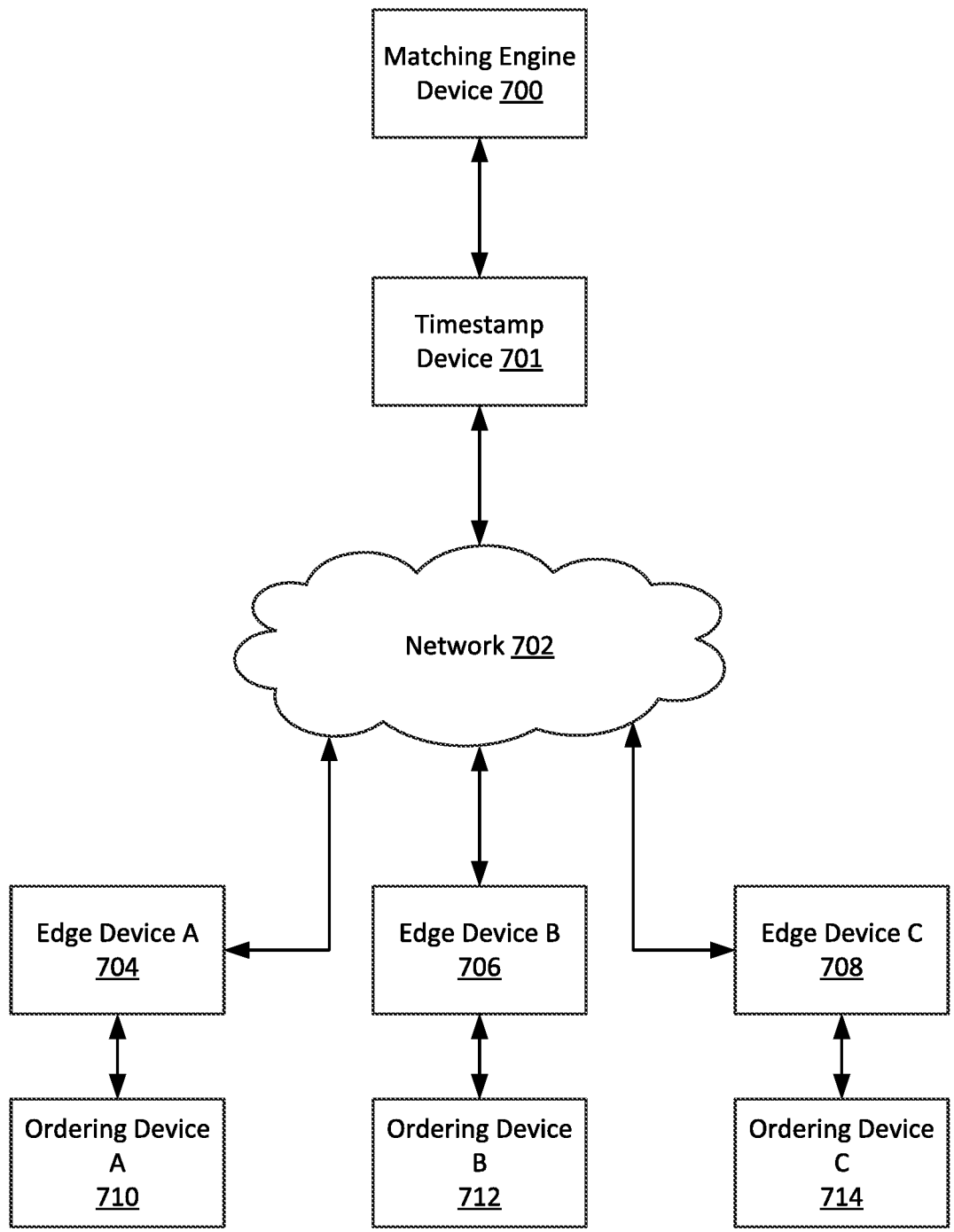
FIG. 7 shows an example in accordance with one or more embodiments of the invention.

FIG. 7 shows an example in accordance with one or more embodiments of the invention. The following example is for explanatory purposes only and not intended to limit the scope of the invention.

Referring to FIG. 7, consider a scenario in which a financial exchange has a matching engine (700) operatively connected to a timestamp device (701) (collectively, a data processing device). The timestamp device is operatively connected, via a network (702) to edge device A (704), edge device B (706), and edge device C (708). Edge device A (704) is operatively connected to an ordering device A (710). Edge device B (706) is operatively connected to an ordering device B (712). Edge device C (708) is operatively connected to ordering device C (714)

In such a scenario, each of the ordering devices (710, 712, 714) wishes to place orders to buy a certain stock via the financial exchange. To that end, transmits an order to their respective edge devices (704, 706, 708). Ordering device A (710) sends the order first. Ordering device B (712) sends the order second. Ordering device C (714) sends the order third. The edge devices receive the orders and, based on a determination that they are time sensitive, adds an ingress timestamp indicating a time of receipt of the order to each of the orders. The orders are then transmitted towards the matching engine via the network (702).

However, due to different network latencies in the network (702), the timestamp device (701) actually receives the order from ordering device C (714) first, then the order from ordering device B (712), then the order from ordering device A (710). The timestamp device (701) stores the orders, and inspects them to ascertain that they each include an ingress timestamp. Based on the ingress timestamps, the timestamp device transmits to the matching engine the order from ordering device A first, then the order from ordering device B, then the order from ordering device C. In other words, the matching engine receives and processes the orders in the order they were received at the edge devices rather than the order they were received from the network.

Although not relevant to this particular specific example, one of ordinary skill in the art, having the benefit of this Detailed Disclosure, will appreciate the following: a computing device may exist on which both matching engine functionality and reorder functionality are performed; the matching engine may wish to implement a different policy (e.g., a discrete time auction, which batches (for example) all orders within one millisecond, and randomizes the order within that one millisecond; and that there may be a constant stream of packets going through the system that all have timestamps, thereby allowing the matching engine to always have a concept of the latest time from the network edge.

Embodiments of the invention described herein allow for increased fairness in delivery/entry of time sensitive information (e.g., market information, gaming information, real estate information, gambling information) to recipients that may use the information in some way. The increase in fairness is achieved either by ensuring the information is delivered to the recipients at substantially the same time, which is achieved by adding a presentation timestamp to outgoing data, which is processed by edge devices, causing the edge devices to wait until a future time to deliver the data. Additionally, embodiments of the invention described herein allow for increased fairness in performing actions requested by entities operatively connected to a data processing device via a network. In one or more embodiments of the invention, action requests are ingress timestamped at the edge of the network when received, allowing the data processing device to order the requests in the order received. Both the delivery of information with a presentation timestamp, and the performance of actions in an order ascertained from ingress timestamps help mitigate the varying latency inherent in the network connecting the edge devices to the data processing device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network traffic data units, the method comprising:

generating a first network traffic data unit comprising an indication that the first network traffic unit should be delayed for a time before re-transmission to a client device, wherein network traffic data units are generated as medium access control (MAC) frames encapsulating internet protocol (IP) packets that encapsulate network traffic data, wherein the indication is a presentation timestamp;

transmitting the first network traffic data unit to a first edge device, wherein the first edge device is configured to facilitate transmission of network traffic between the client device and network;

storing the first network traffic data unit in the first edge device for the time before re-transmission;

transmitting, by the first edge device, the first network traffic data unit to the client device after the time, prior to generating the first network traffic data unit:
receiving, at a data processing device, a received network traffic data unit;
processing, by the data processing device, the received network traffic data unit to determine an action to perform; and
performing, by the data processing device, the action,
generating, after performing the action, a second network traffic data unit comprising the presentation timestamp; and
transmitting the second network traffic data unit to a second edge device,
wherein the edge device comprises one or more physical layer switches configured to provide physical connections between ports of the edge device.

2. The method of claim 1, further comprising:
generating a plurality of additional network traffic data units, wherein at least a portion of the plurality of additional network traffic data units include a second indication that differs from the indication.

3. The method of claim 1, wherein the presentation timestamp comprises a future time.

4. The method of claim 3, wherein the future time is based, at least in part, on a network latency value.

5. The method of claim 1, further comprising:
receiving the first network traffic data unit at the first edge device;
making a first determination that the first network traffic data unit comprises the presentation timestamp;
storing, based on the first determination, the first network traffic data unit in storage;
making a second determination that a time indicated by the presentation timestamp has been reached; and
based on the second determination, transmitting the first network traffic data unit to the client device.

6. The method of claim 1, wherein the presentation timestamp comprises a random delay factor.

7. The method of claim 1, wherein the network traffic data units are associated with transactions of financial instruments.

8. A system for processing network traffic data units, the system comprising:
a data processing device operatively connected, via a network, to a first edge device and a second edge device, wherein the first edge device is configured to facilitate transmission of network traffic between the client device and network, and configured to:
receive a network traffic data unit, wherein network traffic data units are generated as medium access control (MAC) frames encapsulating internet protocol (IP) packets that encapsulate network traffic data;
process the network traffic data unit to determine an action to perform;
perform the action;
generate, after performing the action, a first reply network traffic data unit comprising an indication that the first reply network traffic unit should be delayed for a time before re-transmission to a client device, wherein the indication is a presentation timestamp;
transmit the first reply network traffic data unit to the first edge device,
storing the first reply network traffic data unit in the first edge device for the time before re-transmission; and
transmitting, by the first edge device, the first reply network traffic data unit to the client device after the time,
wherein the edge device comprises one or more physical layer switches configured to provide physical connections between ports of the edge device.

9. The system of claim 8, wherein:
a second edge device is also operatively connected to the data processing device, and
the data processing device is further configured to:
generate, after performing the action, a second reply network traffic data unit comprising the presentation timestamp; and
transmit the second reply network traffic data unit to the second edge device.

10. The system of claim 9, wherein the presentation timestamp comprises a future time.

11. The system of claim 10, wherein the future time is based, at least in part, on a network latency value.

12. The system of claim 9, wherein the first edge device is configured to:
receive the first reply network traffic data unit;
make a first determination that the first reply network traffic data unit comprises the presentation timestamp;
store, based on the first determination, the first reply network traffic data unit in storage;
make a second determination that a time indicated by the presentation timestamp has been reached; and
based on the second determination, transmit the first reply network traffic data unit to the client device.

13. The system of claim 9, wherein the presentation timestamp comprises a random delay factor.

14. The system of claim 8, wherein the network traffic data units are associated with transactions of financial instruments.

* * * * *